US008116387B2

(12) United States Patent
Rofougaran

(10) Patent No.: US 8,116,387 B2
(45) Date of Patent: Feb. 14, 2012

(54) METHOD AND SYSTEM FOR A DIGITAL POLAR TRANSMITTER

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1221 days.

(21) Appl. No.: 11/680,891

(22) Filed: Mar. 1, 2007

(65) Prior Publication Data

US 2008/0212707 A1 Sep. 4, 2008

(51) Int. Cl.
*H04L 25/00* (2006.01)

(52) U.S. Cl. .......... 375/259; 375/354; 375/353

(58) Field of Classification Search .......... 375/296, 375/376, 294, 327, 247; 330/149
See application file for complete search history.

(56) References Cited

U.S. PATENT DOCUMENTS

| | | | | |
|---|---|---|---|---|
| 3,908,181 | A * | 9/1975 | Shigaki et al. | 341/143 |
| 5,184,093 | A * | 2/1993 | Itoh et al. | 331/25 |
| 5,710,517 | A * | 1/1998 | Meyer | 327/163 |
| 5,742,208 | A * | 4/1998 | Blazo | 331/23 |
| 5,801,589 | A * | 9/1998 | Tajima et al. | 331/1 R |
| 5,834,985 | A * | 11/1998 | Sundeg.ang.rd | 332/100 |
| 5,859,659 | A * | 1/1999 | Araki et al. | 347/246 |
| 6,181,955 | B1 * | 1/2001 | Dartois | 455/562.1 |
| 6,392,494 | B2 * | 5/2002 | Takeyabu et al. | 331/11 |
| 6,404,293 | B1 * | 6/2002 | Darabi et al. | 331/37 |
| 6,429,693 | B1 * | 8/2002 | Staszewski et al. | 327/12 |
| 6,483,388 | B2 * | 11/2002 | Khan | 331/18 |
| 6,738,601 | B1 * | 5/2004 | Rofougaran et al. | 455/66.1 |
| 6,744,839 | B1 * | 6/2004 | Tada et al. | 375/376 |
| 6,822,595 | B1 * | 11/2004 | Robinson | 341/144 |
| 6,924,711 | B2 * | 8/2005 | Liu | 332/159 |
| 6,950,957 | B1 * | 9/2005 | O'Leary | 713/401 |
| 7,006,589 | B2 * | 2/2006 | Staszewski et al. | 375/371 |
| 7,095,819 | B2 * | 8/2006 | Bellaouar et al. | 375/376 |
| 7,123,664 | B2 * | 10/2006 | Matero | 375/295 |
| 7,142,063 | B2 * | 11/2006 | Grewing et al. | 331/16 |
| 7,203,262 | B2 * | 4/2007 | Moy et al. | 375/376 |
| 7,224,302 | B2 * | 5/2007 | Dornbusch | 341/143 |
| 7,233,629 | B2 * | 6/2007 | Auranen | 375/316 |
| 7,289,005 | B2 * | 10/2007 | Puma | 332/145 |
| 7,302,235 | B2 * | 11/2007 | Paatelma et al. | 455/68 |
| 7,366,481 | B2 * | 4/2008 | Okada et al. | 455/126 |
| 7,394,418 | B2 * | 7/2008 | Eikenbroek | 341/143 |
| 7,397,868 | B2 * | 7/2008 | Shi et al. | 375/316 |
| 7,432,770 | B2 * | 10/2008 | Shigemori et al. | 331/77 |
| 7,436,920 | B2 * | 10/2008 | Shachar et al. | 375/376 |
| 7,466,195 | B2 * | 12/2008 | Drogi et al. | 330/136 |
| 7,480,344 | B2 * | 1/2009 | Zolfaghari et al. | 375/297 |
| 7,526,055 | B2 * | 4/2009 | Lee | 375/376 |
| 7,528,638 | B2 * | 5/2009 | Lee et al. | 327/158 |
| 7,532,989 | B1 * | 5/2009 | Torosyan | 702/66 |
| 7,535,311 | B2 * | 5/2009 | Nergis | 332/127 |

(Continued)

*Primary Examiner* — Chieh M Fan
*Assistant Examiner* — Santiago Garcia
(74) *Attorney, Agent, or Firm* — Farjami & Farjami LLP

(57) ABSTRACT

Aspects of a system for a digital polar transmitter may include a digital to analog converter circuit (DAC), for which an analog voltage and/or current step size generated in response to a sequence of received binary numbers may be dynamically programmable based on an input control signal. The input control signal may be based on an amplitude modulation (AM) signal. The DAC may receive the sequence of binary numbers, generated based on a phase modulation (PM) signal, from an accumulator circuit. The dynamically programmable-step-size DAC may generate an analog signal, which is amplified by a power amplifier circuit (PA) and transmitted via an antenna. The dynamically programmable-step-size DAC may enable utilization of a linear PA circuit.

30 Claims, 5 Drawing Sheets

U.S. PATENT DOCUMENTS

| | | |
|---|---|---|
| 7,593,698 B1 * | 9/2009 | Johnson et al. ............... 455/102 |
| 7,599,418 B2 * | 10/2009 | Ahmed ......................... 375/135 |
| 2002/0055337 A1 * | 5/2002 | Persico et al. ................ 455/112 |
| 2002/0150169 A1 * | 10/2002 | Kishi ............................ 375/295 |
| 2002/0159555 A1 * | 10/2002 | Staszewski et al. ........... 375/376 |
| 2003/0001681 A1 * | 1/2003 | Asikainen et al. .............. 331/18 |
| 2003/0141932 A1 * | 7/2003 | Toyota et al. ................. 330/285 |
| 2004/0052312 A1 * | 3/2004 | Matero .......................... 375/295 |
| 2004/0097210 A1 * | 5/2004 | Sato ............................. 455/260 |
| 2004/0136441 A1 * | 7/2004 | Ryu et al. ...................... 375/135 |
| 2006/0270346 A1 * | 11/2006 | Ibrahim et al. ................ 455/41.2 |
| 2007/0286322 A1 * | 12/2007 | Uchino et al. ................. 375/376 |
| 2008/0074091 A1 * | 3/2008 | Petrowsky et al. ............. 323/267 |
| 2008/0122496 A1 * | 5/2008 | Wagner ......................... 327/107 |
| 2008/0132195 A1 * | 6/2008 | Maxim et al. .................. 455/334 |
| 2008/0204150 A1 * | 8/2008 | Rofougaran ..................... 331/10 |
| 2008/0205542 A1 * | 8/2008 | Rofougaran ................... 375/271 |
| 2008/0205549 A1 * | 8/2008 | Rofougaran ................... 375/299 |
| 2008/0205550 A1 * | 8/2008 | Rofougaran ................... 375/302 |
| 2008/0205560 A1 * | 8/2008 | Rofougaran ................... 375/344 |
| 2008/0212707 A1 * | 9/2008 | Rofougaran ................... 375/269 |
| 2009/0086795 A1 * | 4/2009 | Rofougaran et al. .......... 375/216 |
| 2009/0086796 A1 * | 4/2009 | Rofougaran ................... 375/219 |
| 2009/0086844 A1 * | 4/2009 | Rofougaran ................... 375/295 |
| 2009/0086851 A1 * | 4/2009 | Rofougaran ................... 375/324 |
| 2009/0237295 A1 * | 9/2009 | Jaklitsch et al. ............... 342/169 |
| 2009/0248929 A1 * | 10/2009 | Rofougaran ................... 710/106 |
| 2009/0258706 A1 * | 10/2009 | Rofougaran et al. ........... 463/39 |

* cited by examiner

METHOD AND SYSTEM FOR A DIGITAL POLAR TRANSMITTER

CROSS-REFERENCE TO RELATED APPLICATIONS/INCORPORATION BY REFERENCE

Not Applicable.

FIELD OF THE INVENTION

Certain embodiments of the invention relate to communication networks. More specifically, certain embodiments of the invention relate to a method and system for a digital polar transmitter.

BACKGROUND OF THE INVENTION

Polar Modulation is related to inphase (I) and quadrature (Q) modulation in the same way that polar coordinates are related to the Cartesian coordinate system. For polar modulation, the orthogonal I and Q components of an RF signal are converted to a phasor representation comprising an amplitude component and a phase component. In this way, the combined I and Q signal may be generated with one phase change and one amplitude change, whereas separate I and Q modulation may require amplitude and phase modulation for each channel, especially for non-constant envelope modulation modes. In addition, the I and Q modulation approach may require good linearity of the power amplifier, often leading to power inefficient designs that suffer from parameter variability due to factors such as temperature. In contrast, polar modulation may allow the use of very efficient and non-linear amplifier designs for non-constant envelope modulation schemes.

In some conventional polar modulation transmitters, an input may be represented as a phase modulation (PM) signal and an amplitude modulation (AM) signal. The PM signal may be input to a direct digital frequency synthesizer (DDFS). The DDFS may utilize the PM signal to generate a sequence binary numbers, each represented by a plurality of bits, which comprise a least significant bit (LSB) and a most significant bit (MSB). Each binary number may be converted to a corresponding voltage level. Thus, the corresponding sequence of voltage levels may form a representation of an analog signal. The analog signal may be input to a power amplifier (PA) circuit.

The AM signal may be input to the PA circuit. The PA circuit may utilize the AM signal to modify the amplitude of the input analog signal. The PA circuit is typically a non-linear amplifier, for example a Class C amplifier. The amplified analog signal may then be transmitted from the conventional polar modulation transmitter.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for a digital polar transmitter, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a digital polar transmitter. Various embodiments of the invention may comprise a digital to analog converter (DAC), which converts input binary numbers to voltage levels that may be determined based on an amplitude modulation (AM) input signal. Consequently, the corresponding difference in voltage levels between consecutive binary numbers in a sequence (referred to as a "step size") may vary based on the AM input signal. Thus, various embodiments of the invention may comprise a programmable-step-size DAC in which the step size may be dynamically programmable based on the AM input signal. In various embodiments of the invention, the power amplifier (PA) circuit may comprise a linear amplifier.

Figure 1:
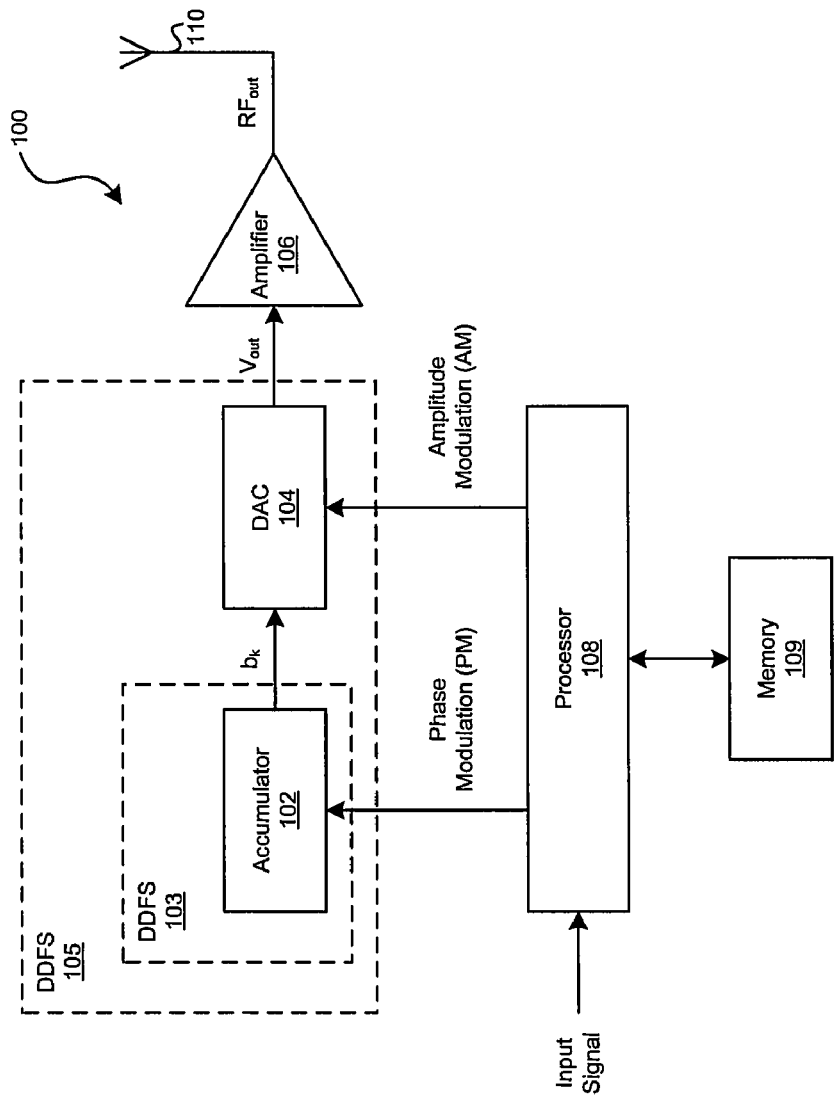
FIG. 1 is a diagram of a polar modulation transmitter with a programmable-step-size digital to analog converter, in accordance with an embodiment of the invention.

FIG. 1 is a diagram of a polar modulation transmitter with a programmable-step-size digital to analog converter, in accordance with an embodiment of the invention. Referring to FIG. 1, there is shown a digital polar transmitter 100. The digital polar transmitter 100 may comprise an accumulator 102, a digital to analog converter (DAC) 104, a PA 106, a processor 108, a memory 109, and an antenna 110. In an exemplary embodiment of the invention, the accumulator 102 may be a part of a DDFS 103. In another exemplary embodiment of the invention, the accumulator 102 and DAC 104 may be part of a DDFS 105. The DDFS 103 and/or 105 may be fabricated utilizing a deep submicron process such as a 45 nanometer (nm) deep submicron process. The 45 nanometer (nm) deep submicron process may be a 45 nanometer (nm) deep submicron CMOS process. In this regard, the DDFS 103 and/or 105 may be enabled to generate high frequency signals that may facilitate polar modulation.

The accumulator 102 may comprise suitable logic, circuitry and/or code that may enable generation of a sequence of binary numbers. Each binary number may comprise a least significant bit (LSB) and a most significant bit (MSB). In an exemplary numerical representation, the sequence of binary numbers may comprise values from 0 to $2^n-1$, where n may be equal to the number of bits contained in each binary number. The operation of the accumulator 102 may be such that upon reaching a value $2^n-1$ the next number in the sequence may be 0 with the sequence continuing. The set of numbers from 0 to $2^n-1$ may represent a period of the sequence.

The accumulator 102 may receive an input signal upon which the value of n may be determined. In various embodiments of the invention, the input signal may be a phase modulation (PM) signal. Consequently, the value for n may be determined by the PM input signal. Thus, the period of the sequence of binary numbers generated by the accumulator 102 may be programmable based on the PM input signal.

The DAC 104 may comprise suitable logic, circuitry and/or code that may enable generation of an analog output signal based on a sequence of input binary numbers. The DAC 104 may generate a corresponding analog voltage level for each input binary number. The number of distinct analog voltage levels may be equal to the number of distinct binary numbers in the input sequence.

The DAC 104 may receive an input control signal upon which the corresponding analog voltage level for each input binary number may be determined. In various embodiments of the invention, the input control signal may be an AM signal. The corresponding analog voltage level for a given binary input number may be determined based on the input AM signal. In addition, the corresponding analog voltage level for each other distinct binary input number in a sequence may also be determined based on the input AM signal. Furthermore, the step size, corresponding to the difference in corresponding analog voltage levels between consecutive binary input numbers in the sequence may be determined based on the input AM signal. Consequently, various embodiments of the invention may comprise a DAC that enables a programmable step size based on an input control signal.

The PA circuit 106 may comprise suitable logic, circuitry and/or code that may enable amplification of input signals to generate a transmitted output signal of sufficient signal power (as measured by dBm, for example) for transmission via a wireless communication medium. In various embodiments of the invention, the PA circuit may comprise a linear amplifier circuit. In various embodiments of the invention, the PA circuit 106 may receive an analog input signal and generate a transmitted output signal, which is transmitted via the antenna 110.

The processor 108 may comprise suitable logic, circuitry and/or code, which, in the context of the present application, may enable generation of AM and PM signals based on a received input signal. The received input signal may comprise an in-phase (I) component, and a quadrature-phase (Q) component. The AM and PM signals may be generated based on the magnitudes of the I and Q components, and the relative phase relationship between I and Q component signals.

The memory 109 may comprise suitable logic, circuitry and/or code that may enable storage and/or retrieval of data and/or code. The memory 109 may utilize any of a plurality of storage medium technologies, such as volatile memory, for example random access memory (RAM), and/or non-volatile memory, for example electrically erasable programmable read only memory (EEPROM). In the context of the present application, the memory 109 may enable storage of code and/or data that enables generation of AM and PM signals based on a received input signal.

In operation, the processor 108 may receive a quadrature input signal. The quadrature input signal may comprise an I component and a Q component. The processor 108 may compute corresponding AM and PM signals based on the I and Q components of the received quadrature input signal. The AM and/or PM signals may be digital signals, each carrying data in binary words. The PM signal may be sent to the accumulator 102, and the AM signal sent to the DAC 104. The accumulator 102 may utilize the PM signal to determine a modulus value n(PM) based on the PM signal. Consequently, the accumulator may generate a sequence of binary numbers: $0, 1, \ldots, 2^{n(PM)}, 0, 1, \ldots, 2^{n(PM)}, 0, 1, \ldots$ The period of the sequence of binary numbers may be represented by the sub-sequence of binary numbers comprising $0, 1, \ldots, 2^{n(PM)}$.

The DAC 104 may receive the sequence of binary numbers as binary words, each comprising a plurality of bits. Each binary word may comprise an LSB and an MSB. The DAC 104 may utilize the binary word and the input AM signal to determine a corresponding analog voltage level. In various embodiments of the invention, the DAC 104 may utilize an entry in binary weighted current sources that increase or decrease a bias current level based on input AM signal data. In an exemplary embodiment of the invention, when the bias current level is determined, the analog voltage level corresponding to an input binary number may be determined by summing voltage contributions for each nonzero-valued bit in the input binary number. In another exemplary embodiment of the invention, when the bias current level may be determined, the analog voltage level corresponding to an input binary number may be determined by summing voltage contributions for each zero-valued bit in the input binary number.

In various embodiments of the invention, the analog voltage level, summed from voltage contributions for each bit in a given input binary number, may increase when the bias current level increases, and may decrease when the bias current level decreases. Consequently, the analog voltage level for a given input binary number may be programmable based on the input AM signal.

For a given input binary number, $b_k$, a consecutive binary number in a sequence, $b_{k+1}$, may be determined by incrementing the value of the given input binary number. For example:

$$b_{k+1} = b_k + 1 \qquad [1]$$

For a given input binary number, the corresponding analog voltage level generated by the DAC 104 may be represented by $V_a(b_k, AM)$, which indicates that the analog voltage level may be determined based on the input binary number and the AM input signal. As such, the step size for the DAC 104, $Size_{step}(AM)$, may be represented as in the following equation, for example:

$$Size_{Step}(AM) = V_a(b_{k+1}, AM) - V_a(b_k, AM) \qquad [2]$$

As shown in equation [2], when the analog voltage levels $V_a(b_k, AM)$ and/or $V_a(b_{k+1}, AM)$ change in response to changes in the AM signal, the step size $Size_{Step}(AM)$ may also change. Thus, in various embodiments of the invention, the DAC 104 may enable a programmable step size based on the input AM signal.

The DAC 104 may generate an analog output signal $V_{out}$ based on the sequence of corresponding analog voltage levels generated in response to the input binary sequence received from the accumulator 102. The analog signal may be input to the PA circuit 106, which may amplify the input analog signal to generate an analog output signal, $RF_{out}$, which may be transmitted in a wireless communication medium via the antenna 110. In various embodiments of the invention, the PA circuit 106 may comprise a linear amplifier.

Figure 2A:
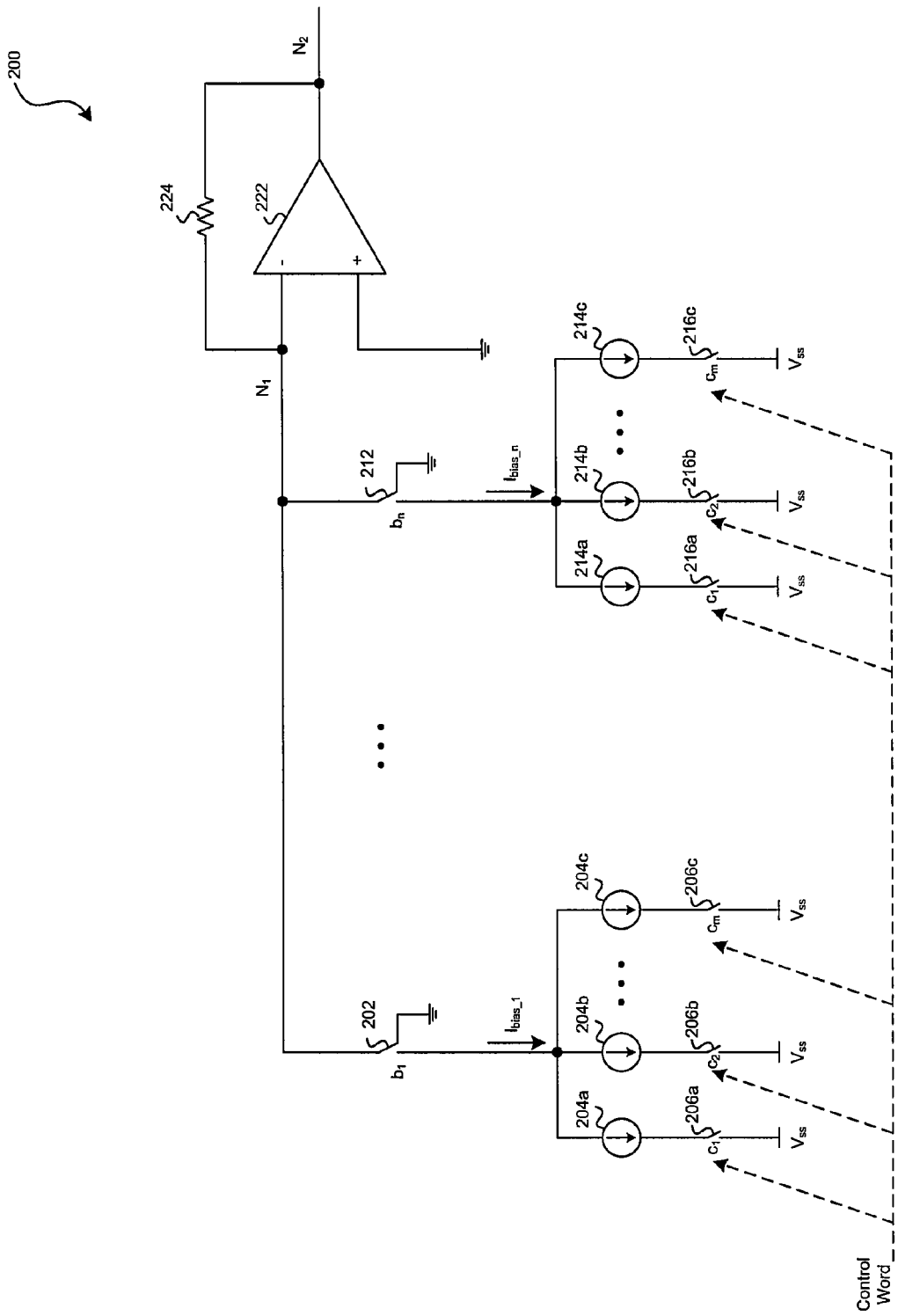
FIG. 2A is a diagram of an exemplary digital to analog converter circuit with binary weighted current sources, in accordance with an embodiment of the invention.

FIG. 2A is a diagram of an exemplary digital to analog converter circuit with binary weighted current sources, in accordance with an embodiment of the invention. Referring to FIG. 2A, there is shown a DAC 200. In various embodiments of the invention, the DAC 200 may represent an embodiment of the DAC 104 shown in FIG. 1. The DAC 200 may comprise a plurality of selector switches 202 and 212, a plurality of current sources 204a, 204b, 204c, 214a, 214b and 214c, a plurality of contact switches 206a, 206b, 206c, 216a, 216b and 216c, an operational amplifier 222, and a resistor 224.

In FIG. 2A, the bits $b_1, \ldots,$ and $b_n$ may indicate bits in an input binary number to the DAC 200, where $b_1$ may represent the LSB and $b_n$ may represent the MSB. The bits $c_1, \ldots,$ and $c_m$ may indicate bits in an input control word to the DAC 200, for example, bits generated from the AM input signal to the DAC 200.

The selector switch 202 may be configured in an OPEN or CLOSED state based on the input bit $b_1$. The selector switch 202 may be configured to couple the node labeled $N_1$ to ground when in an OPEN state, or to the current sources 204a, 204b and 204c when in a CLOSED state. In instance when the selector switch 202 may be configured in a CLOSED state, the current flowing through the selector switch 202, $I_{bias\_1}$, may be equal to the sum of current supplied by the current sources 204a, 204b and 204c.

The contact switch 206a may be configured in an OPEN or CLOSED state based on the control bit $c_1$. The contact switch 206a may enable the current source 204a to supply a current level, $I_{1,1}$, which is nonzero when in a CLOSED state. In instance when the contact switch 206a may be in an OPEN state, an open circuit condition may exist in which case the current source 204a may supply a current level of zero.

The contact switch 206b may be configured in an OPEN or CLOSED state based on the control bit $c_2$. The contact switch 206b may enable the current source $204_b$ to supply a current level, $I_{1,2}$, which may be nonzero when in a CLOSED state. In instance when the contact switch 206b may be in an OPEN state the current source 204b may supply a current level of zero.

The contact switch 206c may be configured in an OPEN or CLOSED state based on the control bit $c_m$. The contact switch 206c may enable the current source 204c to supply a current level, $I_{1,m}$, which may be nonzero when in a CLOSED state. In instances when the contact switch 206c may be in an OPEN state the current source 204b may supply a current level of zero.

Based on the foregoing, the current $I_{bias\_1}$ may be represented as in the following equation:

$$I_{bias\_1} = \sum_{i=1}^{m} c_i \cdot I_{1,i} \qquad [3]$$

The selector switch 212 may be configured in an OPEN or CLOSED state based on the input bit $b_n$. The selector switch 212 may be configured to couple the node labeled $N_1$ to ground when in an OPEN state, or to the current sources 214a, 214b and 214c when in a CLOSED state. In instance when the selector switch 212 may be configured in a CLOSED state, the current flowing through the selector switch 212, $I_{bias\_n}$, may be equal to the sum of current supplied by the current sources 214a, 214b and 214c.

The contact switch 216a may be configured in an OPEN or CLOSED state based on the control bit $c_1$. The contact switch 216a may enable the current source 214a to supply a current level, $I_{n,1}$, which is nonzero when in a CLOSED state. In instance when the contact switch 216a may be in an OPEN state the current source 214a may supply a current level of zero.

The contact switch 216b may be configured in an OPEN or CLOSED state based on the control bit $c_2$. The contact switch 216b may enable the current source 214b to supply a current level, $I_{n,2}$, which is nonzero when in a CLOSED state. In instance when the contact switch 216b may be in an OPEN state the current source 214b may supply a current level of zero.

The contact switch 216c may be configured in an OPEN or CLOSED state based on the control bit $c_m$. The contact switch 216c may enable the current source 214c to supply a current level, $I_{n,m}$, which is nonzero when in a CLOSED state. In instances when the contact switch 216c may be in an OPEN state the current source 214b may supply a current level of zero.

Based on the foregoing, the current $I_{bias\_n}$ may be represented as in the following equation:

$$I_{bias\_n} = \sum_{i=1}^{m} c_i \cdot I_{n,i} \qquad [4]$$

The operational amplifier 222 and the resistor 224 may generate an output voltage at the node labeled $N_2$ based on an input voltage at the node labeled $N_1$. The operational amplifier 222 and resistor 224 may represent a negative feedback circuit such that the voltage appearing at the node labeled $N_1$ may be the negative of the voltage appearing at the node labeled $N_2$. Thus, an decrease in the voltage appearing at the node $N_1$ may correspond to an increase in the voltage appearing at the node $N_1$. For example, an increasingly negative voltage (or decrease in voltage) appearing at the node $N_1$ may correspond to an increasingly positive voltage (or increase in voltage) appearing at the node $N_2$.

The voltage appearing at the node $N_1$ may be determined based on a sum of individual current contributions $I_{bias\_1}, \ldots, I_{bias\_n}$. The total current flowing through the node $N_1$, $I_{bias}$, may be represented as in the following equation:

$$I_{bias} = I_{ref} \sum_{i=1}^{n} b_i \cdot I_{bias\_i} \qquad [5]$$

where $I_{ref}$ may represent a constant reference current value. The current sources levels $I_{i,j}$ supplied by each of the current sources 204a, 204b, 204c, 214a, 214b and 214c may exhibit the following characteristics:

$$I_{i,1} = I_{i,2} = \ldots = I_{i,m} \qquad [6]$$

for values $1 \leq i \leq n$ and:

$$I_{n,j} = 2 \cdot I_{n-1,j} = \ldots = 2^{n-1} \cdot I_{1,j} \qquad [7]$$

for values $1 \leq j \leq m$.

According to equation [3], the bias current $I_{bias\_1}$ may increase or decrease based on the input control word to the DAC 200. An increase in the bias current $I_{bias\_1}$ may result in a decrease in the voltage appearing at the node $N_1$ when the selector switch 202 is in a CLOSED state. The difference in the voltage level appearing at the node $N_1$ when the selector switch 202 may be in a CLOSED state, and the voltage level appearing at the node $N_1$ when the selector switch 202 may be in an OPEN state may correspondingly increase or decrease based on the input control word to the DAC 200. The difference in voltage level appearing at the node $N_1$ in response to the selector switch 202 toggling between a CLOSED state and an OPEN state may be referred to as a voltage step. Thus, in various embodiments of the invention, the voltage step associated with the operation of the selector switch 202 may increase or decrease based on the input control word to the DAC 200.

According to equation [4], the bias current $I_{bias\_n}$ may increase or decrease based on the input control word to the DAC 200. An increase in the bias current $I_{bias\_n}$ may result in a decrease in the voltage appearing at the node $N_1$ when the selector switch 212 is in a CLOSED state. The difference in the voltage level appearing at the node $N_1$ when the selector switch 212 is in a CLOSED state, and the voltage level appearing at the node $N_1$ when the selector switch 212 may be in an OPEN state may correspondingly increase or decrease based on the input control word to the DAC 200. Thus, in various embodiments of the invention, the voltage step size associated with the operation of the selector switch 212 may increase or decrease based on the input control word to the DAC 200.

Figure 2B:
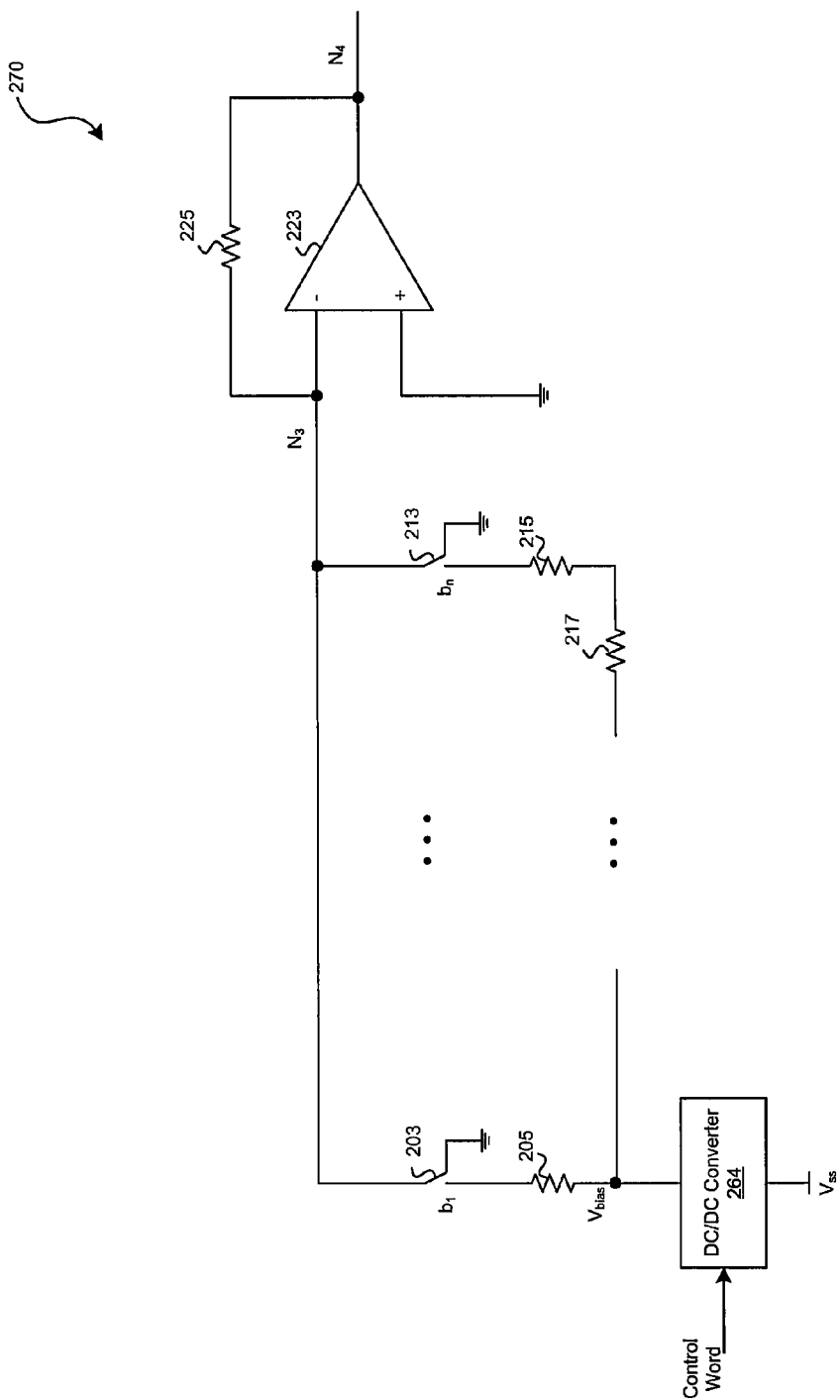
FIG. 2B is a diagram of an exemplary digital to analog converter circuit with a configurable bias voltage, in accordance with an embodiment of the invention.

FIG. 2B is a diagram of an exemplary digital to analog converter circuit with a configurable bias voltage, in accordance with an embodiment of the invention. Referring to FIG. 2B, there is shown a DAC 270. In various embodiments of the invention, the DAC 270 may represent an embodiment of the DAC 104 shown in FIG. 1. The DAC 270 may comprise a plurality of selector switches 203 and 213, a plurality of resistors 225, 205, 215 and 217, a DC to DC (DC/DC) voltage converter 264, and an operational amplifier 223. The operational amplifier 223 may be substantially similar to the operational amplifier 222. The operational amplifier 223 and resistor 225 may form a negative feedback circuit and may be substantially similar to the negative feedback circuit comprising the operational amplifier 222 and resistor 224.

The DC/DC converter 264 may comprise suitable logic, circuitry and/or code that may enable conversion of an input supply voltage, $V_{SS}$, to a bias voltage, $V_{bias}$, based on an input control word to the DAC 270. In an exemplary embodiment of the invention, the DC/DC converter 264 may comprise a switching regulator circuit.

The selector switch 203 may be configured in an OPEN or CLOSED state based on the input bit $b_1$. The selector switch 203 may be configured to couple the node labeled $N_3$ to ground when in an OPEN state, or to the resistor 205 when in a CLOSED state.

The selector switch 213 may be configured in an OPEN or CLOSED state based on the input bit $b_n$. The selector switch 213 may be configured to couple the node labeled $N_3$ to ground when in an OPEN state, or to the resistor 215 when in a CLOSED state.

The resistors 205, 215 and 217 may comprise a portion of a resistor divider network that enables the voltage appearing at the node labeled $N_3$ to change in response to the opening or closing of individual selector switches 203 and 213. A voltage step may occur in the voltage appearing at the node $N_3$ in response to a toggling of the respective selector switches 203 and/or 213 between the CLOSED state and the OPEN state. The voltage step occurring at the node $N_3$ in response to the opening or closing of the selector switch 203 or 213 may be equivalent to the voltage step occurring at the node $N_1$ (FIG. 2A) in response to the opening or closing of the selector switch 202 or 212. The corresponding step size resulting from the operation of each of the respective switches 203 and/or 213 may be based on the voltage level appearing at the node labeled $V_{bias}$. The voltage level appearing at the node $V_{bias}$ may increase or decrease based on the application of input control word to the DC/DC converter 264. Thus, in various embodiments of the invention, the voltage step size associated with the operation of a selector switch 203 or 213 may increase or decrease based on the input control word to the DAC 270.

Figure 3:
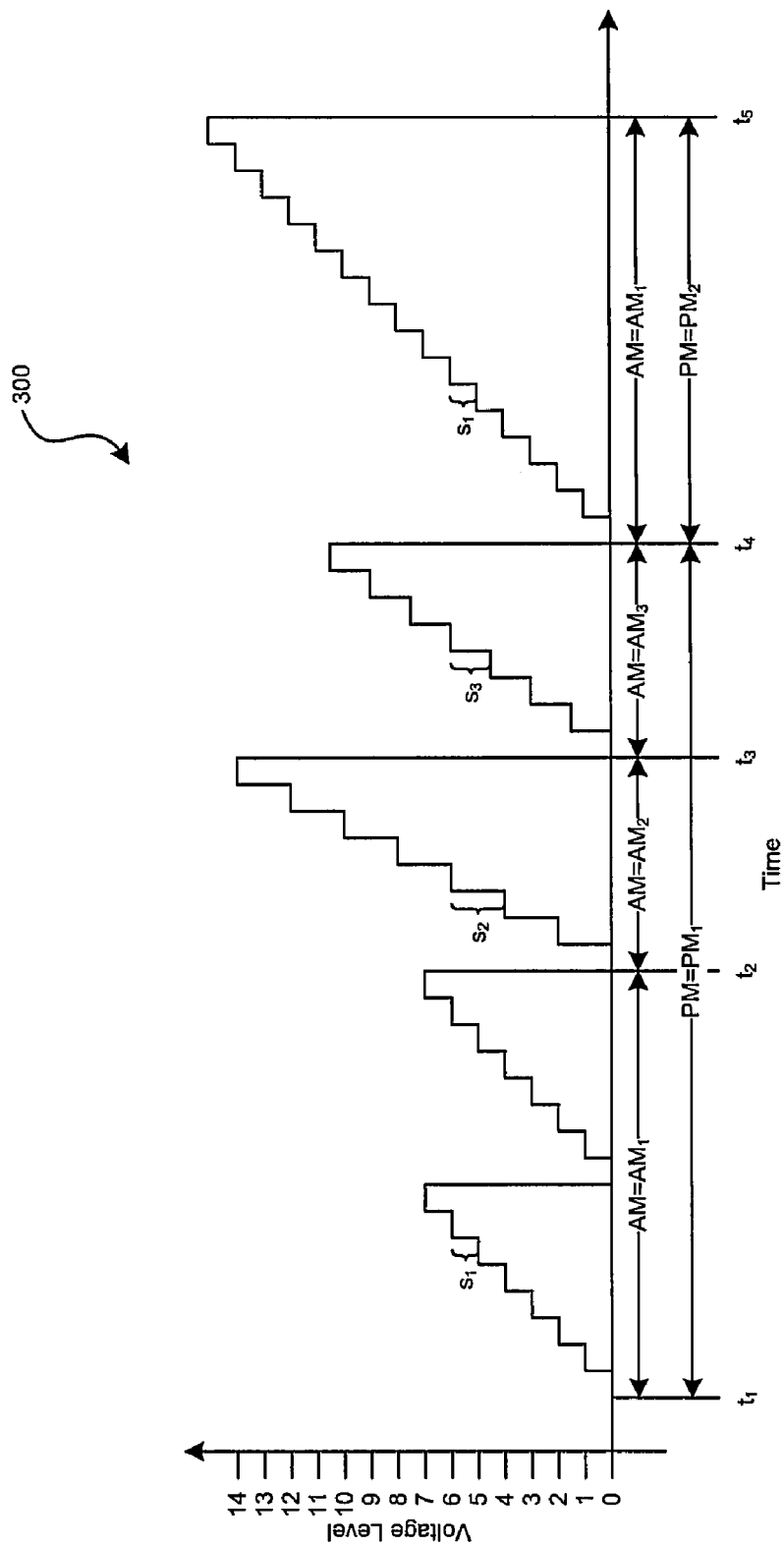
FIG. 3 is a diagram of an exemplary signal illustrating step size programmability based on amplitude modulation information in a polar modulation transmitter, in accordance with an embodiment of the invention.

FIG. 3 is a diagram of an exemplary signal illustrating step size programmability based on amplitude modulation information in a polar modulation transmitter, in accordance with an embodiment of the invention. Referring to FIG. 3, there is shown an exemplary graph 300 of an exemplary signal generated by the DAC 104 in response to a binary sequence of numbers received from the accumulator 102. The horizontal axis of the exemplary graph 300 shows time, which may be measured in relevant units (for example, milliseconds), while the vertical axis shows voltage level, which may also be measured in relevant units (for example, hundreds of millivolts). As shown in the exemplary graph 300, during a first time interval between time instants indicated as $t_1$ and $t_2$, the value of the AM data may be represented $AM_1$, while the value of the PM data may be represented $PM_1$. During this first time interval, the step size may be represented $s_1$. As shown in the exemplary graph 300, $s_1=1$ voltage unit, and the period of the binary number sequence is 8.

During a second time interval between time instants indicated as $t_2$ and $t_3$, the value of the AM data may be represented $AM_2$, while the value of the PM data may be represented $PM_1$. During this second time interval, the step size may be represented $s_2$. While the exemplary graph 300 may indicate that the period of the sequence of binary numbers remains the same between the first time interval and the second time interval, the step size for the first time interval, $s_1$, is shown as being different from the step size for the second time interval, $s_2$. As shown in the exemplary graph 300, $s_2=2$ voltage units. As shown in the exemplary graph 300, $s_2>s_1$. Thus, as shown in the exemplary graph 300, the change in the AM data from $AM_1$ in the first time interval, to $AM_2$ in the second time interval may result in a corresponding change in the step size for the DAC 104. The change in the AM value may correspond to a change in the amplitude of the analog output signal $V_{out}$ generated by the DAC 104.

During a third time interval between time instants indicated as $t_3$ and $t_4$, the value of the AM data may be represented $AM_3$, while the value of the PM data may be represented $PM_1$. During this third time interval, the step size may be represented $s_3$. While the exemplary graph 300 may indicate that the period of the sequence of binary numbers remains the same between the second time interval and the third time interval, the step size for the second time interval, $s_2$, is shown as being different from the step size for the third time interval, $s_3$. As shown in the exemplary graph 300, $s_3=1.5$ voltage units. As shown in the exemplary graph 300, $s_2>s_3>s_1$.

During a fourth time interval between time instants indicated as $t_4$ and $t_5$, the value of the AM data may be represented $AM_1$, while the value of the PM data may be represented $PM_2$. During this fourth time interval, the step size may be represented by $s_1$. While the exemplary graph 300 may indicate that the step size of the fourth time interval is equal to the step size in the first, the period of the sequence of binary numbers in the fourth time interval may be different from the period of the sequence of binary numbers in the preceding time intervals. The change in PM value may correspond to a change in the phase of the analog signal $V_{out}$ generated by the DAC 104. As shown in the exemplary graph 300, the period of the binary number sequence during the fourth time interval is 16.

Figure 4:
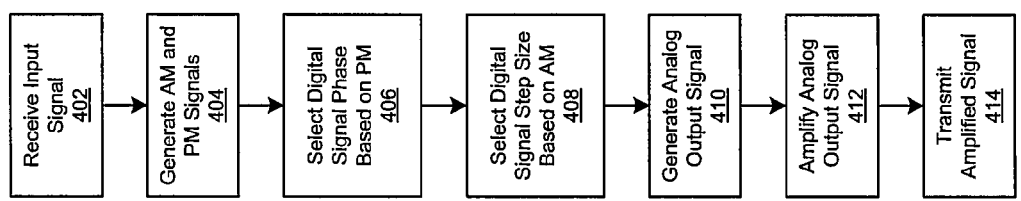
FIG. 4 is a flow chart illustrating exemplary steps for a digital polar modulation transmitter with programmable-step-size digital to analog signal conversion, in accordance with an embodiment of the invention.

FIG. 4 is a flow chart illustrating exemplary steps for a digital polar modulation transmitter with programmable-step-size digital to analog signal conversion, in accordance with an embodiment of the invention. Referring to FIG. 4, in step 402, the processor 108 may receive an input signal. The input signal may be a quadrature input signal. In step 404, the processor 108 may generate AM and PM signals based on the input signal. The AM and/or PM signals may be digital signals. In step 406, the accumulator 102 may select a digital signal phase based on the PM signal. The digital phase may correspond to a period of a sequence of binary numbers generated by the accumulator 102. In step 408, the DAC 104 may generate a digital signal step size based on the AM signal. The step size may be determined as shown in equation [2], for example. In step 410, the DAC 104 may generate an analog output signal $V_{out}$. In step 412, the PA 106 may amplify the analog output signal $V_{out}$ to generate an amplified signal $RF_{out}$. In step 414, the amplified signal $RF_{out}$ may be transmitted in a wireless communication medium via the antenna 110.

Various embodiments of the invention may comprise a plurality of DAC circuit designs for which the analog voltage output, in response to an input binary number, may vary based on a bias current and/or bias voltage. In addition, various embodiments of the invention may be practiced in DAC circuits for which both a bias current and/or bias voltage may be controlled based on an input control word.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for generating signals in a wireless communication system, the method comprising:
    amplitude modulating by a digital-to-analog converter, an input phase modulated signal; and
    generating by said digital-to-analog converter, an output signal comprising a variable step size;
    generating said output signal based on a sequence comprising a plurality of binary numbers;
    generating one or more voltage levels in response to said sequence comprising said plurality of binary numbers; and
    dynamically controlling each of said generated one or more voltage levels based on an input control word.

2. The method according to claim 1, wherein a voltage difference between said generated one or more voltage levels corresponding to a current one of said plurality of binary words and said generated one or more voltage levels corresponding to a succeeding one of said plurality of binary words in said sequence is a voltage step.

3. The method according to claim 2, comprising dynamically controlling said voltage step based on an input control word.

4. The method according to claim 3, comprising generating said input control word based on an amplitude modulation signal.

5. The method according to claim 2, comprising dynamically controlling said voltage step by controlling a plurality of current source circuits.

6. The method according to claim 5, comprising controlling each of said plurality of current source circuits based on at least a portion of an input control word.

7. The method according to claim 2, comprising dynamically controlling said voltage step by controlling a voltage converter circuit.

8. The method according to claim 7, comprising controlling said voltage converter circuit based on an input control word.

9. The method according to claim 1, comprising generating said sequence based on a phase modulation signal.

10. The method according to claim 1, comprising amplifying said generated output signal to generate an RF signal that is transmitted via a wireless communication medium.

11. The method according to claim 10, wherein said amplifying is performed utilizing a linear amplifier circuit.

12. A system for generating signals in a wireless communication system, the system comprising:
    one or more circuits comprising at least a digital-to-analog converter, that enable amplitude modulation, by said digital-to-analog converter, of an input phase modulated signal; wherein
    said one or more circuits enable generation, by said digital-to-analog converter, of an output signal comprising a variable step size;
    said one or more circuits enable generation of said output signal based on a sequence comprising a plurality of binary numbers;
    said one or more circuits enable generation of one or more voltage levels in response to said sequence comprising said plurality of binary numbers; and
    said one or more circuits enable dynamic control of each of said generated one or more voltage levels based on an input control word.

13. The system according to claim 12, wherein a voltage difference between said generated one or more voltage levels corresponding to a current one of said plurality of binary words and said generated one or more voltage levels corresponding to a succeeding one of said plurality of binary words in said sequence is a voltage step.

14. The system according to claim 13, wherein said one or more circuits enable dynamic control of said voltage step based on an input control word.

15. The system according to claim 14, wherein said one or more circuits enable generation of said input control word based on an amplitude modulated signal.

16. The system according to claim 13, wherein said one or more circuits comprise a plurality of current sources, and enable dynamic control of said voltage step by controlling said plurality of current source circuits.

17. The system according to claim 16, wherein said one or more circuits enable control of each of said plurality of current source circuits based on at least a portion of an input control word.

18. The system according to claim 13, wherein said one or more circuits comprise a voltage converter circuit, and enable dynamic control of said voltage step by controlling said voltage converter circuit.

19. The system according to claim 18, wherein said one or more circuits enable control of said voltage converter circuit based on an input control word.

20. The system according to claim 12, wherein said one or more circuits enable generation of said sequence based on a phase modulation signal.

21. The system according to claim 12, wherein said one or more circuits enable amplification of said generated output signal to generate an RF signal that is transmitted via a wireless communication medium.

22. The system according to claim 21, wherein said one or more circuits comprise a linear amplifier circuit, and said amplifying is performed utilizing said linear amplifier circuit.

23. The method according to claim 1, wherein said generated output signal is an output polar modulated signal.

24. The method according to claim 1, comprising generating said input phase modulated signal by a direct digital frequency synthesizer.

25. The method according to claim 1, wherein said input phase modulated signal is generated based on a quadrature signal that comprises an in-phase component and a quadrature-phase component.

26. The method according to claim 1, comprising dynamically varying said variable step size during operation of said digital-to-analog converter.

27. The system according to claim 12, wherein said generated output signal is an output polar modulated signal.

28. The system according to claim 12, wherein said one or more circuits comprise a direct digital frequency synthesizer, and enable generation of said input phase modulated signal by said direct digital frequency synthesizer.

29. The system according to claim 12, wherein said input phase modulated signal is generated based on a quadrature signal that comprises an in-phase component and a quadrature-phase component.

30. The system according to claim 12, wherein said one or more circuits enable dynamic variation of said variable step size during operation of said digital-to-analog converter.

\* \* \* \* \*